United States Patent [19]

Linenfelser

[11] 3,857,133

[45] Dec. 31, 1974

[54] COMBINATION SCRUBBING AND WIPING SPONGE

[75] Inventor: Carl J. Linenfelser, Brooklyn, Mich.

[73] Assignee: Brooklyn Products, Inc., Brooklyn, Mich.

[22] Filed: Mar. 29, 1973

[21] Appl. No.: 345,884

[52] U.S. Cl............ 15/118, 15/244 B, 161/DIG. 3, 161/121
[51] Int. Cl........................... A47l 13/16, B32b 5/18
[58] Field of Search............ 15/104.93, 104.94, 118, 15/244 B, 244 C; 51/400, 401, 402, 407; 161/121, DIG. 3

[56] References Cited
UNITED STATES PATENTS

| | | | |
|---|---|---|---|
| 2,341,818 | 2/1944 | Schellings | 15/244 C |
| 2,739,093 | 3/1956 | Bull | 161/DIG. 3 |
| 2,961,332 | 11/1960 | Nairn | 161/DIG. 3 |
| 3,005,219 | 10/1961 | Miller | 15/118 X |
| 3,182,346 | 5/1965 | Winston | 15/104.93 |
| 3,206,784 | 9/1965 | Linenfelser | 15/118 |
| 3,284,963 | 11/1966 | Lanham et al. | 15/104.93 X |
| 3,446,685 | 5/1969 | Goldstone et al. | 161/121 X |
| 3,556,918 | 1/1971 | Lemelson | 15/118 X |
| 3,638,270 | 2/1972 | Schlegel et al. | 15/244 B X |

FOREIGN PATENTS OR APPLICATIONS 274,663  11/1964  Australia.............................. 15/118

Primary Examiner—Daniel Blum
Attorney, Agent, or Firm—Beaman & Beaman

[57] ABSTRACT

A dual purpose sponge formed basically of polyurethane ester foam having a foam body of a sponge-like consistency and a layer of open celled foam having cells of larger dimension forming an abrasive surface, the abrasive foam being thermally bonded to the sponge foam body at spaced locations defining an embossed pattern in the abrasive foam. The opposite side of the sponge is used for wiping and light duty cleaning and is provided with a decorative embossment and a wear resistant skin layer of high density, or may include an absorbent fabric bonded thereto.

1 Claim, 6 Drawing Figures

PATENTED DEC 31 1974　　3,857,133

COMBINATION SCRUBBING AND WIPING SPONGE

BACKGROUND OF THE INVENTION

The invention pertains to scrubbing and wiping sponges having surfaces of diverse physical characteristics.

Scouring pads have long been a standard utensil employed for general cleaning, and are particularly useful where the removal of foreign matter from a hard surface requires a scrubbing action. Such scouring pads are formed of steel wool, fabric, synthetic plastic strands and foams, sponges, and combinations of these and other materials. Scouring pads formed of synthetic plastic materials are popular in that they are not subject to the formation of rust, are easily cleanable and reusable, and may be used with anti-adhesion cooking utensil surface coatings such as sold under the trademark Teflon, without damaging the surface coating.

One disadvantage of scouring pads formed of synthetic plastic material lies in the single purpose use of most such devices, and the configuration, handling, and "body" of such pads make handling difficult, and such pads usually have a short usable life. Representative scouring and cleaning devices are shown in U.S. Pat. Nos. 1,820,256; 2,885,703; 3,005,219; 3,038,187; 3,040,353; 3,080,688 and 3,169,264.

SUMMARY OF THE INVENTION

It is an object of the invention to provide a combination scrubbing and wiping sponge which may be used for cleaning purposes, is of an economical construction and includes surfaces of diverse physical characteristics permitting the sponge to be used as an abrasive cleaner, or a wiping sponge.

A further object of the invention is to provide a cleaning sponge which is long wearing, convenient to handle, of a rugged construction, and easy to clean for reuse.

In the preferred embodiment of the invention the sponge is entirely formed of foam polyurethane ester material, however, in a disclosed embodiment, a surface of the sponge utilizes an absorbent layer of fabric material, such as terry cloth, in order to provide a variation of surface within the concept of the invention.

Basically, the invention consists of a sponge body of foamed polyurethane ester material having a rectangular configuration, the sponge foam being of a relatively small open celled configuration. Upon one side of the body a sheet of polyurethane ester material having large open cells is bonded at spaced locations by the use of heat, and the sheet forms an abrasive patterned surface.

The opposite side of the sponge foam body may be embossed for decorative purposes, and preferably includes a skin layer of high density foam formed of the body material which renders the surface wear resistant and usable for sponge and conventional water absorbent applications.

The foam body and foam sheet are thermally bonded, preferably in an embossed strip-like manner defining diamond embossments, and the foam materials are also thermally bonded adjacent the body periphery such that the two foams form an inseparable unit, yet flexibility and self-cleaning is achieved.

A fabric may be bonded to the sponge body side opposite with respect to the abrasive foam sheet, and the fabric, such as terry cloth, may be thermally bonded throughout its area to the sponge body, and adjacent the periphery thereby providing a wiping or scrubbing surface suitable for use with scouring powders, and the like.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENTS

Figure 1:
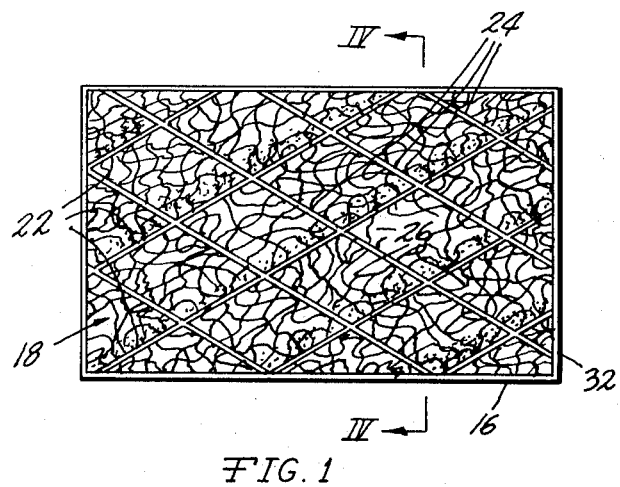
FIG. 1 is a plan view of the combination scrubbing and wiping sponge in accord with the invention illustrating the scrubbing side thereof.
Figure 2:
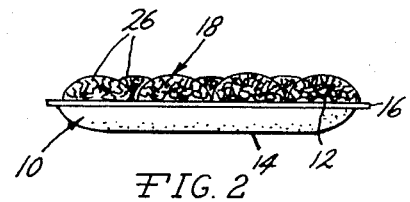
FIG. 2 is an end, elevational view of the sponge.

In accord with the invention the sponge assembly includes a body 10 of a rectangular peripheral configuration having a side 12, an oppositely related side 14 and a periphery 16. Preferably, the body 10 is formed of a foamed polyurethane ester material having open cells of a density approximately 60-80 pores per inch. This material is sponge-like, absorbent, and heat formable and bondable.

The abrasive material of the sponge comprises an open celled reticulated polyurethane ester foam 18 having cells of considerably larger dimension than those of the body 10, for instance, 10 pores per inch. The abrasive foam 18 is preferably formed into sheets by fabricating techniques, such as cutting, which define a plurality of sharp projections 20, FIG. 4, where the material of the foam is severed. Such projections and sharp edges, along with the open celled structure of the foam material 18, give the foam material abrasive characteristics very effective to remove foreign matter from the surface of a utensil, or the like, to be cleaned.

The abrasive foam material 18 is bonded to the foam body 10 by heat sealing. Such bonding is in the form of linear strips, two sets of strips being illustrated in the disclosed embodiment. The set of strips 22 extend in parallel space relationship to each other, diagonally related to the major length of the body 10. The set of strips 24 are also spaced parallel with respect to each other, and obliquely disposed to the strips 22 intersecting the same such that the foam 18 consists of a plurality of diamond shaped embossments 26, each embossment at its periphery being bonded to the foam body surface 12, and reaching a maximum "height" at its central region. The bonding of the foam thus produces a plurality of foam protuberances firmly connected to the foam surface 12 at their periphery, but the protuberances are not connected to the surface 12 except at the strips 22 and 24. This method of attachment of the foam 18 to the foam body 10 facilitates self-cleaning, and assures a high degree of flexibility of the sponge for squeezing or compressing the water therefrom.

Figure 4:
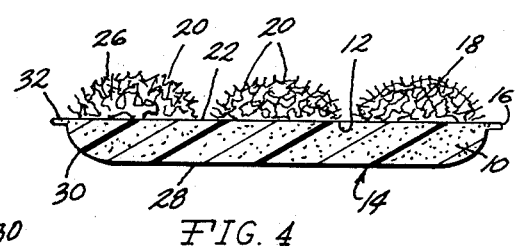
FIG. 4 is an elevational, sectional view as taken along Section IV—IV of FIG. 1.

The abrasive foam 18 is also heat sealed to the foam body 10 throughout the body's periphery 16, as will be apparent in FIGS. 1 and 4.

Figure 3:
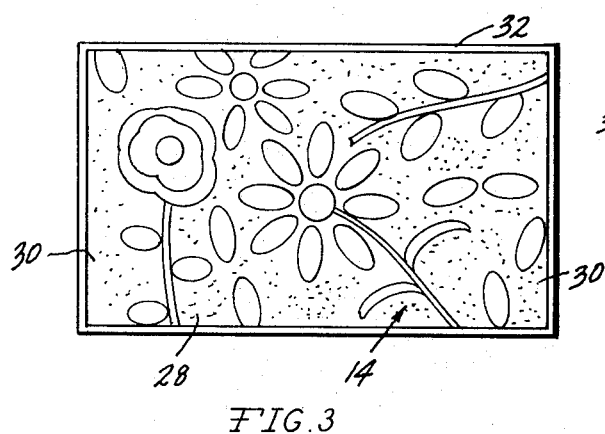
FIG. 3 is a bottom view of the sponge of FIGS. 1 and 2.

In the preferred embodiment the foam body side 14 is formed with a skin layer 28 of a greater density than the interior of the foam body, and is provided with an attractive embossed design as will be apparent from FIG. 3. Also, the side 14 is radiused as at 30, FIG. 4 and a bead 32 is formed at the periphery of the sponge maintaining the radiused configuration of the side 14, and also defining the heat sealed peripheral joint between the foams 10 and 18.

The high density skin 28 increases the wear resistance of the foam body 10, and the side 14 may be used for wiping and water absorbing purposes, and may also be used for light scouring, particularly when employed in conjunction with a scouring powder. The presence of the bead 32, which is of a stiffer physical characteristic than the foam body 18, aids in gripping and holding the sponge, and aids in the maintenance of the sponge configuration during use.

The sponge in accord with the invention may be constructed in a one or two step manner. For instance, a large sheet of sponge foam material may be placed in a heated press and a sheet of foam 18 placed thereover. Such initial sheets may be two feet square, or larger. The dies of the press are closed, and the upper heated die includes projections which form the strips 22 and 24, and also form the sealed peripheral bead 32. The lower die includes the embossed design configuration, and as the lower die is also heated, the compression of the foam material during bonding of the foams increases the density of the foam engaging the lower die producing the wear resistance skin 28, and radius 30. After such forming the larger sheet is then placed in a cutting die to cut the assembled sheet into smaller sponge pads along the peripheral beads. In a commercial embodiment the resultant sponges are 3½ inches by 5 inches and approximately three-fourth inch thick.

By slightly modifying the rib projections of the upper and lower dies forming the heat sealing at the periphery of the defined sponges, the large foam assemblies described above could be severed into sponges of the final desired size at the completion of the heat sealing and heat forming step. Likewise, it will be appreciated that the final sponge configuration can be achieved by a single compression of heated dies defining cavities of the final dimensional size desired.

In use, the sponge is held so that the foam 18 may be held against the surface to be cleaned, if the maximum cleaning effect is desired. The open cell configuration, and the projections 20 provide a plurality of sharp edges for cleaning purposes, and the foam material is soft enough to prevent damage to soft surfaces, such as a Teflon anti-adhesive cooking utensil surface.

For wiping, water absorbing or light scouring powder usage the side 14 is employed, and the skin layer 28 is not of such a high density as to affect the water absorbing characteristics of the body.

The sponge is easily cleaned by holding the same under water and squeezing to flex the foam permitting the foreign particles to be removed. As no metal is employed the sponge will not rust or deteriate between uses.

Figure 5:
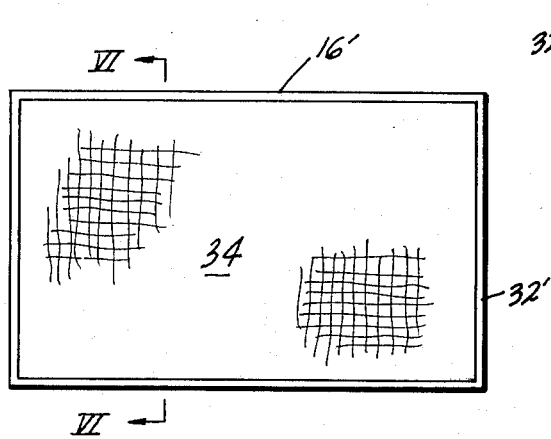
FIG. 5 is a bottom view of an embodiment of sponge using a fabric bonded to a surface.
Figure 6:
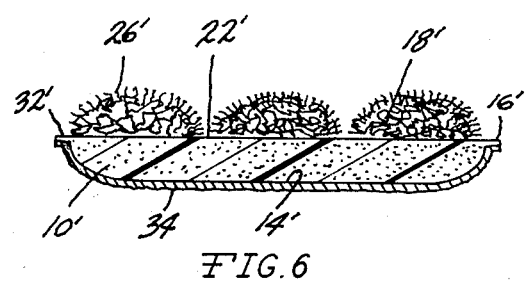
FIG. 6 is an elevational, sectional view of the embodiment of FIG. 5 as taken along VI—VI thereof.

FIGS. 5 and 6 disclose a variation in construction, and components similar to those previously described are referenced by primed reference numerals. In this embodiment a fabric is bonded to the foam body side 14, preferably by a heat sealing process.

The fabric 34, such as terry cloth, is heat sealed throughout the entire area of the side 14, and closely conforms to the configuration of the side as will be apparent from FIG. 6. The fabric 34 constitutes one side of the bead 32'. The fabric 34 is used in a manner similar to the side 14, and is particularly effective for water absorption purposes and wiping actions. Of course, the fabric surface also may be used with scouring powders, and the flexible nature of the fabric in no way detracts from the compressibility and self-cleaning characteristics of the sponge.

It is appreciated that modifications to the inventive concept may be apparent to those skilled in the art without departing from the spirit and scope of the invention.

I claim:

1. A scrubbing and wiping sponge comprising, in combination, a body of open cell foamed polyurethane ester having a periphery and first and second sides oppositely disposed with respect to each other, a relatively thick sheet of open cell reticulated foamed polyurethane ester having an exterior side and an interior side disposed over said body first side having cells of a dimension greater than that of said body foam and having a plurality of sharp projections formed thereon defining an abrasive outer surface at said exterior side, a plurality of elongated thermal joining strips defined in said foam sheet by compressing portions of said sheet exterior and interior sides into engagement with said body first side and thermally bonding said sheet to said body only at spaced locations defining said sheet into an embossed pattern, said sheet and said body also being thermally bonded throughout said body periphery, said strips comprising two sets of strips each comprising parallel spaced linear strips, the strips of said sets obliquely intersecting defining a raised self-cleaning embossed diamond pattern on said sheet, and said foam body at said second side defining a skin layer of higher density foam resistant to abrasive wear.

* * * * *